United States Patent [19]

Haltof

[11] Patent Number: 5,480,115

[45] Date of Patent: Jan. 2, 1996

[54] HAND RELEASE BRACKET

[76] Inventor: Garry P. Haltof, 1470 East Ave., Rochester, N.Y. 14610

[21] Appl. No.: 412,468

[22] Filed: Mar. 29, 1995

Related U.S. Application Data

[63] Continuation-in-part of Ser. No. 262,623, Jun. 20, 1994.

[51] Int. Cl.⁶ ..................................................... A47B 96/06
[52] U.S. Cl. .................................. 248/221.11; 248/309.1; 379/455
[58] Field of Search ......................... 248/222.1, 221.3, 248/309.1; 379/426, 433, 446, 445, 449, 454, 455; 224/42.42

[56] References Cited

U.S. PATENT DOCUMENTS

| | | |
|---|---|---|
| 3,889,071 | 6/1975 | Davis et al. . |
| 4,517,420 | 5/1985 | Haskins . |
| 4,588,866 | 5/1986 | Monti . |
| 4,718,625 | 1/1988 | Boda ................................. 248/222.1 |
| 4,741,034 | 4/1988 | Errichiello ........................... 379/433 |
| 4,782,528 | 11/1988 | Inove ................................. 379/455 |
| 4,907,265 | 3/1990 | Uchino et al. . |
| 4,969,187 | 11/1990 | Hattori ................................ 379/433 |
| 5,069,407 | 12/1991 | Williams ............................ 248/221.3 |
| 5,113,436 | 5/1992 | Jarvela et al. . |
| 5,142,573 | 8/1992 | Umezawa ........................... 379/441 X |
| 5,157,722 | 10/1992 | Hollowed et al. . |
| 5,179,590 | 1/1993 | Wang ................................. 224/42.42 |
| 5,187,744 | 2/1993 | Richter .............................. 224/42.42 |
| 5,189,698 | 2/1993 | Hakanen ........................... 379/454 X |
| 5,230,016 | 7/1993 | Yasuda . |
| 5,253,292 | 10/1993 | Fluder et al. . |
| 5,282,246 | 1/1994 | Yang ................................. 379/455 |
| 5,295,649 | 3/1994 | Lee .................................. 248/309.1 X |
| 5,305,381 | 4/1994 | Wang ................................ 379/426 X |
| 5,383,091 | 1/1995 | Snell ................................. 379/455 X |
| 5,392,350 | 2/1995 | Swanson .......................... 379/454 X |
| 5,410,597 | 4/1995 | Kepley ............................... 379/449 |

FOREIGN PATENT DOCUMENTS

| | | | |
|---|---|---|---|
| 2241132 | 8/1991 | United Kingdom ................. 379/455 |
| 2274975 | 8/1994 | United Kingdom ................. 379/454 |

Primary Examiner—J. Franklin Foss
Attorney, Agent, or Firm—Eugene Stephens & Associates

[57] ABSTRACT

A bracket holding an instrument in a latched position is hand releasable by a single hand gripping the sides of the instrument while moving a finger engageable surface to release a latch that is pivoted on the bracket. The latch is biased into a latched position, and the instrument is preferably biased out of a latched position so that the instrument does not rattle when latched and releases to the hand gripping it when the latch is unlatched.

17 Claims, 3 Drawing Sheets

HAND RELEASE BRACKET

RELATED APPLICATIONS

This application is a Continuation-In-Part of parent application Ser. No. 08/262,623, filed 20 Jun. 1994, entitled PULL RELEASE BRACKET. The parent application is hereby incorporated by reference.

FIELD OF THE INVENTION

This invention involves a release mechanism for removing a hand holdable instrument from a support bracket.

BACKGROUND

Support brackets are widely used for supporting hand holdable instruments, such as telephones, remote controls, and specialized tools. The brackets often include a latch and a release mechanism so that the instrument can be latched in place when supported by the bracket and can be removed from the bracket by releasing the latch.

Such brackets for hand holdable instruments suffer from a variety of problems. These include: complexity and expense, number of parts involved, inconvenience in use, and excessive or awkward movements that are required for actuating a latch release to remove the instrument from the bracket. Dissatisfaction with present support brackets for hand holdable instruments has led to the development of the bracket disclosed in this application, which aims to overcome as many as possible of the problems experienced by previous brackets.

SUMMARY OF THE INVENTION

A hand holdable instrument bracket according to the invention has a latch release arranged so that a hand gripping the instrument for removal from the bracket can release the latch with a finger motion. This allows a thumb and finger of one hand to grip the instrument and pull it away from the bracket as the latch releases in response to movement of another finger of the same hand.

Otherwise, the bracket holds the instrument in a latched support position from which it is free to move in only one direction, and the latch holds the instrument against moving in that direction. The instrument is preferably biased toward the removal direction, and the latch is biased toward the latch position. Releasing the latch overcomes the latch bias and unlatches the instrument, which is released into the grip of the hand releasing the latch for moving the instrument in the removal direction.

DRAWINGS

FIG. 1 is a partially schematic front view of a bracket with a hand release latch for holding an instrument according to the invention.

FIGS. 2, 3, and 4 are partially schematic and partially cut-away side views of the latch and bracket of FIG. 1 showing an instrument latched position in FIG. 2, an instrument unlatched position in FIG. 3, and an instrument removal position in FIG. 4.

FIG. 5 is a partially schematic side view of a hand release latch and bracket similar to the one shown in FIGS. 1–4, but differing in the way that the latch and the instrument are biased.

DETAILED DESCRIPTION

Figure 1:
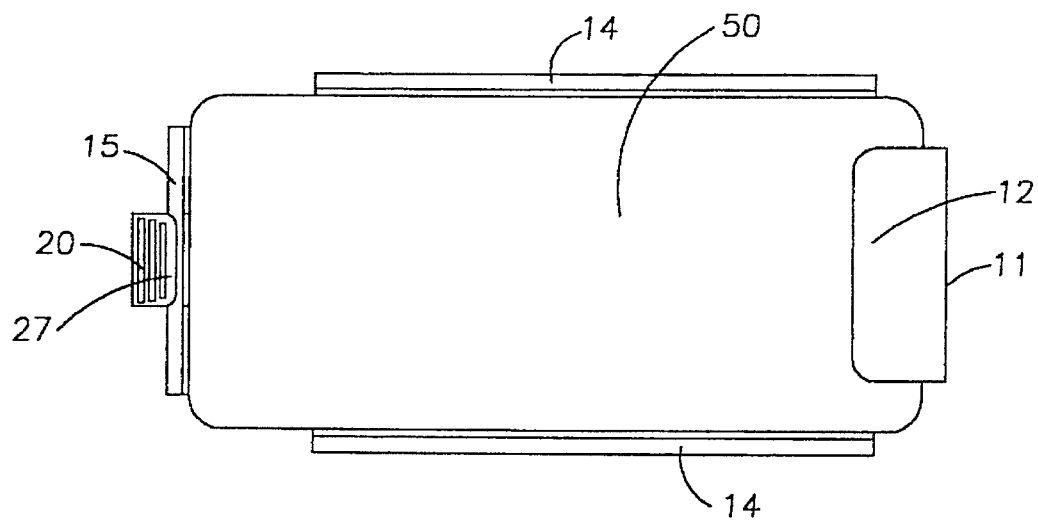
Figure 2:
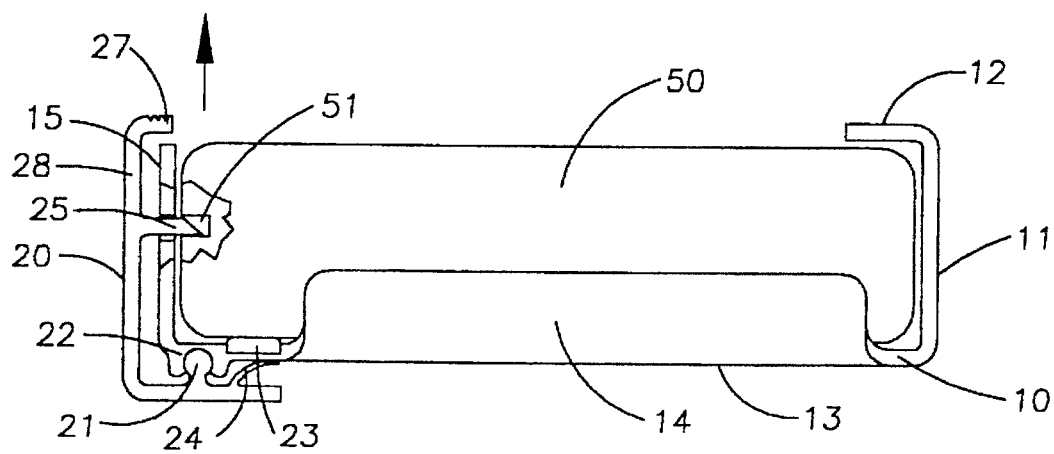

FIGS. 1 and 2 schematically show an instrument holding bracket 10 with a finger release latch 20 according to the invention. The bracket 10 holds the instrument 50 in a supported position from which it can escape in only one direction, as shown by the arrow in FIG. 2. The desirable characteristics of the bracket 10 are its ability to hold instrument 50 securely in a convenient position, to keep instrument 50 from falling out of bracket 10 accidentally, to limit the removal of instrument 50 to a single direction, and to release instrument 50 when required.

Bracket 10 includes a latch 20 that latches instrument 50 in the supported position shown in FIGS. 1 and 2. Latch 20 is also involved in the release motion that allows instrument 50 to be removed quickly and easily with one hand from a latched position on bracket 10.

Figure 3:
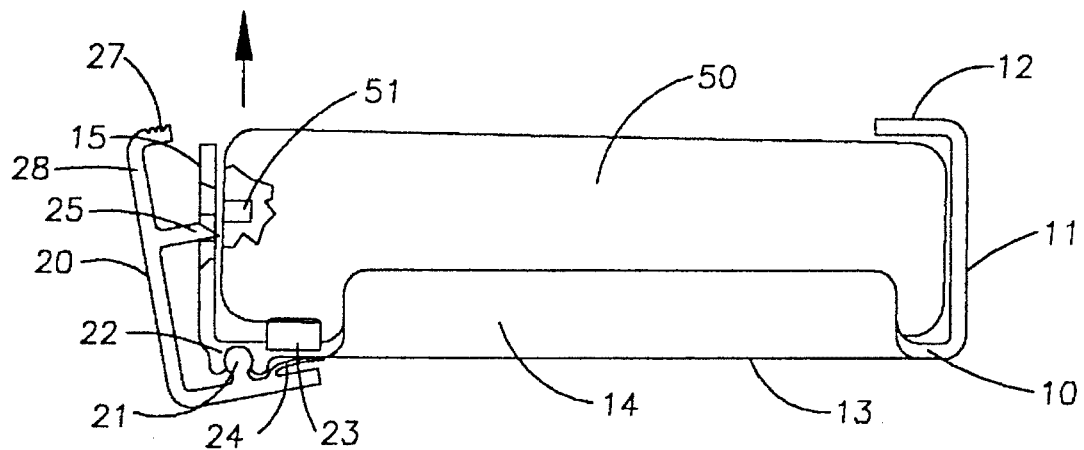
Figure 4:
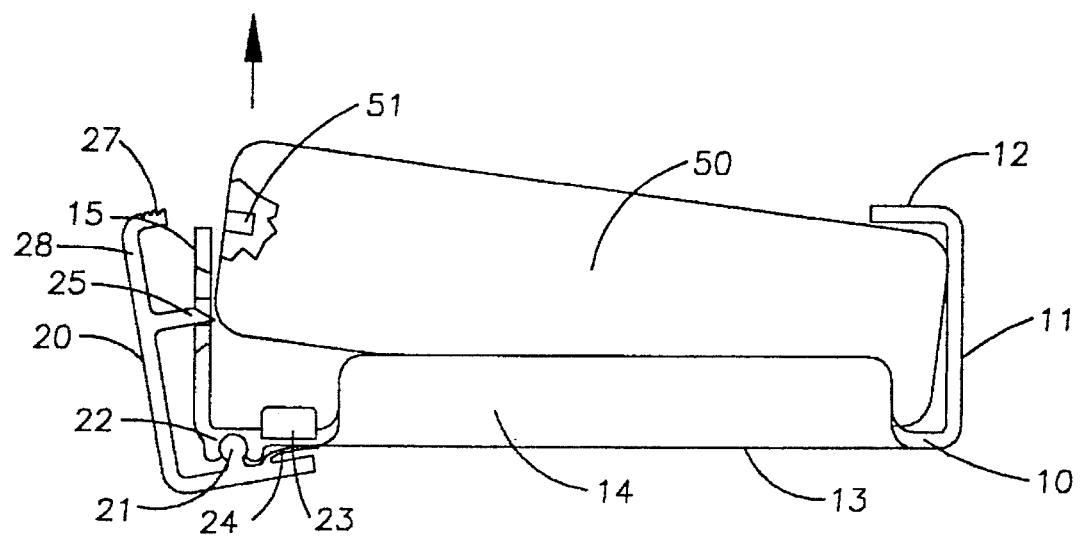

For holding instrument 50 and limiting its removal motion, bracket 10 includes a base or fixed end region 11 that has fixed holder 12 wrapped around one end region of instrument 50. Bracket 10 also has a bottom 13 and side walls 14 that help retain instrument 50 in place in a supported position. A bracket end wall 15, opposite end wall 11, extends over the latched end of instrument 50 so that the removal direction of instrument 50 from bracket 10 is limited to movement in the direction of the arrow in FIG. 2, as illustrated in FIGS. 3 and 4.

Latch 20 is pivotally mounted on bracket 10, preferably by means of a snap-in pivot 21 formed on an axis extending across latch 20 and having a snap-fit interconnection with a groove 22 arranged along a similar axis on bracket 10. This lets latch 20 pivot between the latch position shown in FIG. 2 and the unlatched position shown in FIGS. 3 and 4.

Latch 20 has a latch element or catch 25 that hooks or interlocks with recess 51 in instrument 50. Catch 25 can also interlock and latch with a projection formed on instrument 50 or with an outward facing surface of instrument 50. Preferably, the surface of instrument 50 that is engaged by latch element 25 is perpendicular to the removal direction so that pulling on instrument 50 cannot cam latch catch 25 out of latched position with instrument 50. The catch 25 on latch 20 is preferably aligned in the removal direction with latch pivot 21. In other words, a plane passing through the pivot axis 21 of latch 20 and extending to intersect catch 25 is generally aligned with the instrument removal direction indicated by the arrow in FIGS. 2,–5. This also ensures that pulling on instrument 50 cannot cam catch 25 into an unlatched position.

Latch 20 is also biased into the latched position shown in FIG. 2, and this can be accomplished in several ways. Springs or resilient elements are preferred; and as shown in FIGS. 2–4, a resilient leaf spring 24 is formed on latch 20 to engage the underside 13 of bracket 10.

Instrument 50 is also preferably biased toward the removal direction shown by the arrow in FIGS. 2 and 3. This is accomplished in the embodiment illustrated in FIGS. 2–4 by an elastic pad 23 that is resiliently compressed when instrument 50 is pushed into the latched position shown in FIG. 2. When latch 20 is latched, the bias of pad 23 or some other resilient element ensures that instrument 50 does not move or rattle in its latched position. When latch 20 is unlatched, as shown in FIG. 3, resilient element 23 moves instrument 50 out of the latched position toward the removal direction, as slightly exaggerated in FIG. 3. Once unlatched, instrument 50 moves out of latch position and cannot be relatched without being pushed back into bracket 10. The movement from the latch position caused by resilient element 23, which could also be a leaf spring or other spring arranged on bracket 10, starts instrument 50 moving toward the removal direction so that the remainder of the instrument removal can follow smoothly from the movement started by bias element 23.

Figure 5:
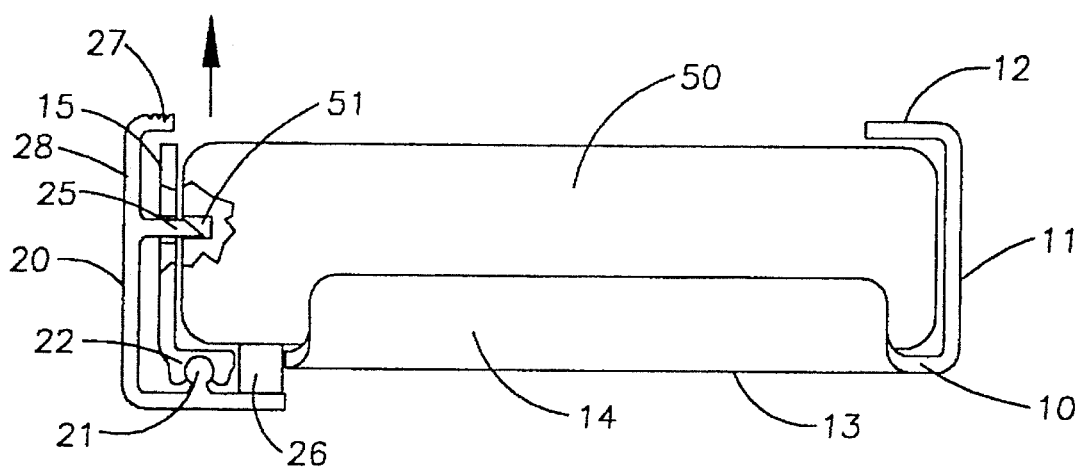

The embodiment of FIG. 5 is similar to the embodiment of FIGS. 1–4, but uses a different resilient element 26. Element 26 is a spring or other resilient element arranged on latch 20 and engaging instrument 50 through an opening in bottom 13 of bracket 10. When instrument 50 is pushed into a latched position in bracket 10, it pushes resilient element 26 and latch 20 into latched position as well. Resilient element 26 then provides the bias that urges instrument 50 against catch 25 and pushes instrument 50 out of latched position toward the removal direction, when unlatched as shown in FIG. 3. It also provides the bias that holds latch 20 in the latched position illustrated in FIG. 5.

Latch 20 has a finger engageable surface 27 that can be pushed or moved by a finger of a hand straddling and engaging the sides of instrument 50. A thumb and finger, for example, gripping the sides of instrument 50 can provide a base or fulcrum from which another finger pushes on surface 27 to release latch 20, freeing instrument 50 for removal from bracket 10 by the hand already gripping it. Surface 27 can be disposed near the top or front of bracket 10 on an extension 28 from latch 20.

Surface 27 is preferably configured with a ridge and groove pattern as illustrated, or with some other distinctive marking to draw a user's attention. This helps a user's finger find the successful operating position.

Pushing on finger engageable surface 27 pivots latch 20 on pivot 21 to release catch 25 from its latching engagement with instrument 50. The latch release and the instrument gripping and removal are all accomplished with a single hand gripping the instrument and moving surface 27 in a simple and convenient motion.

There are many places where finger engageable surface 27 can be conveniently located for access by a hand engaging the sides of instrument 50. Also, the movement of surface 27, for pivoting latch 20, depends on the position of surface 27 relative to latch pivot 21, which can be varied. The configuration of other parts of bracket 10 can also be varied to accommodate the desired accessibility and movement of finger engageable surface 27.

Bracket 10 and latch 20 can be made with as few as two components, each of which is preferably injection molded of resin material. If latch 20 is formed with a resilient element 26, shown in FIG. 5, it can provide the necessary bias for latching latch 20 and urging instrument 50 from the latched position. Otherwise, a separate bias element 23 for instrument 50, as shown in FIGS. 2–4, raises the total number of parts to 3. The small number of parts simplifies the cost and assembly of the latch and bracket combination; and yet the assembly is operated conveniently and reliably, with a simple and comfortable motion, for unlatching and removing instrument 50. Returning instrument 50 to a latched position is simply a matter of placing one end of instrument 50 within bracket end 11 and then pushing the latch end of instrument 50 into latched position.

I claim:

1. A hand release latch and bracket for releasably retaining a hand holdable instrument, the hand release latch and bracket comprising:

a. a pivotal mount for the latch on the bracket so that the latch releasably engages and retains the instrument on the bracket;

b. a finger release element for moving the latch to an unlatched position for releasing the instrument from the bracket; and c. the finger release element being arranged in proximity with the inter-engagement of the latch and the instrument so that a thumb and finger can engage opposite sides of the instrument while another finger operates the finger release element to release the latch, whereupon the instrument moves into the grip of the thumb and finger so that moving of the finger release element can be stopped and the instrument can be withdrawn from the bracket by the thumb and finger gripping the instrument.

2. The hand release latch and bracket of claim 1 wherein a resilient element is arranged for moving the instrument out of latched position when the latch is released.

3. The hand release latch and bracket of claim 2 wherein the latch is biased into a latching engagement with the instrument.

4. The hand release latch and bracket of claim 3 wherein the resilient element provides the latch bias.

5. The hand release latch and bracket of claim 1 wherein the pivot mount for the latch and a latch element for engaging the instrument are aligned with a direction of release of the instrument from the bracket.

6. The hand release latch and bracket of claim 1 wherein the finger release element is a push button movable in the direction of release motion of the latch.

7. A combination of a hand release latch and a bracket for supporting a hand holdable instrument, the combination comprising:

a. a pivot interconnecting the latch and the bracket;

b. a resilient element biasing the latch into a latch position;

c. the latch having a catch engaging and latching against a latch surface of the instrument;

d. a latch release element having a finger engageable surface formed on the latch, the release element being arranged so that finger actuation of the engageable surface pivots the latch against the resilient element and moves the catch to an unlatched position; and e. the finger engageable surface of the release element being configured and positioned so that a thumb and finger engaging opposite sides of the instrument can hold the instrument while another finger engages and moves the latch release element far enough to release the instrument into the grip of the thumb and finger.

8. The combination of claim 7 wherein the instrument is biased out of its latched position on the bracket.

9. The combination of claim 8 wherein the resilient element is formed as part of the latch and is disposed for resiliently engaging the bracket.

10. The combination of claim 9 wherein the resilient element provides the bias applied to move the instrument from its latched position.

11. The combination of claim 7 wherein the pivot provides a snap fit interconnection between the latch and the bracket.

12. The combination of claim 7 wherein the finger release element is a push button arranged in proximity with the catch.

13. A combination latch and bracket for a hand holdable instrument, the combination comprising:

a. the latch is pivotally mounted on the bracket, is biased into a latching engagement with the instrument, and has a catch for engaging the instrument in a latched position;

b. a plane through a pivot axis of the latch pivot extending in a direction that intersects the catch is generally aligned with the direction of the only movement that allows the instrument to escape from the bracket;

c. the instrument is urged in the removal direction to be biased against the catch; and d. the latch is manually engageable and pivotable for unlatching the instrument to release the instrument for moving in the removal direction whereupon a hand engaging the instrument during unlatching then moves the instrument in the removal direction.

14. The combination of claim 13 wherein the manual engagement of the latch is in a push direction.

15. The combination of claim 13 wherein the catch and an instrument latch surface engaged by the catch are oriented so that pulling on the instrument cannot cam the latch to an unlatched position.

16. The combination of claim 13 wherein a resilient element biases the instrument in the removal direction.

17. The combination of claim 13 wherein the resilient element also biases the latch into the latched position.

* * * * *